US009398459B2

(12) United States Patent
Brusilovsky et al.

(10) Patent No.: US 9,398,459 B2
(45) Date of Patent: *Jul. 19, 2016

(54) PREVENTION OF EAVESDROPPING TYPE OF ATTACK IN HYBRID COMMUNICATION SYSTEM (71) Applicant: Alcatel-Lucent, Boulogne Billancourt (FR)

(72) Inventors: Alec Brusilovsky, Naperville, IL (US); Violeta Cakulev, Milburn, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/508,254

(22) Filed: Oct. 7, 2014

(65) Prior Publication Data
US 2015/0024714 A1   Jan. 22, 2015

Related U.S. Application Data (63) Continuation of application No. 13/047,256, filed on Mar. 14, 2011, now Pat. No. 8,897,751.

(51) Int. Cl.
H04W 12/06   (2009.01)
H04L 29/06   (2006.01)
H04W 12/12   (2009.01)

(52) U.S. Cl.
CPC ............ *H04W 12/06* (2013.01); *H04L 63/08* (2013.01); *H04L 63/10* (2013.01); *H04L 63/105* (2013.01); *H04W 12/12* (2013.01)

(58) Field of Classification Search
None
See application file for complete search history.

(56) References Cited

U.S. PATENT DOCUMENTS

| 6,556,820 | B1 | 4/2003 | Le et al. | |
| 2002/0072349 | A1* | 6/2002 | Geiselman et al. | 455/411 |
| 2008/0198907 | A1 | 8/2008 | Breitfuss | |
| 2010/0106971 | A1 | 4/2010 | Premec | |
| 2011/0004762 | A1 | 1/2011 | Horn | |
| 2011/0191576 | A1 | 8/2011 | Forsberg et al. | |

(Continued)

FOREIGN PATENT DOCUMENTS

CN   101399767 A    4/2009
JP   2010533390 A   10/2010
WO  PCT/CN2009/030155 A1   3/2009

OTHER PUBLICATIONS

U. Meyer et al., "A Man-in-the-Middle Attack on UMTS," Proceedings of the 2004 ACM Workshop on Wireless Security (WiSe), Oct. 2004, pp. 90-97.

(Continued)

*Primary Examiner* — David Le
(74) *Attorney, Agent, or Firm* — Ryan, Mason & Lewis, LLP (57) ABSTRACT Techniques are disclosed for use in securing communications in environments comprising hybrid communication systems. For example, a method comprises, in a hybrid communication system wherein at least one computing device is configured to selectively operate in a first communication mode or a second communication mode, preventing the at least one computing device from completing an attachment process in the first communication mode when it is determined that authentication data being used to authenticate the at least one computing device in the first communication mode was generated for an authentication process in the second communication mode.

20 Claims, 5 Drawing Sheets

(56) References Cited

U.S. PATENT DOCUMENTS

2012/0094684 A1 4/2012 Reddy
2013/0100814 A1 4/2013 Kennedy et al.
2015/0264563 A1 9/2015 He

OTHER PUBLICATIONS

3 GPP LTE, "3rd Generation Partnership Project; Technical Specification Group Services and System Aspects; 3GPP System Architecture Evolution (SAE); Security Architecture (Release 9)," 3GPP TS 33.401, V9.5.0, Technical Specification, Oct. 2010, 105 pages.

3rd Generation Partnership Project 3GPP, "3rd Generation Partnership Project; Technical Specification Group Services and System Aspects; 3GPP System Architecture Evolution (SAE); Security Architecture (Release 9)," 3GPP TS 33.401, V9.6.0, Technical Specification, Dec. 2010, 105 pages.

* cited by examiner

PREVENTION OF EAVESDROPPING TYPE OF ATTACK IN HYBRID COMMUNICATION SYSTEM

CROSS-REFERENCE TO RELATED APPLICATION

The present application is a continuation of U.S. patent application Ser. No. 13/047,256, filed on Mar. 14, 2011, the disclosure of which is hereby incorporated by reference herein.

FIELD OF THE INVENTION

The present invention relates generally to communication security and, more particularly, to techniques for preventing an eavesdropping type of attack, such as a man-in-the-middle attack, in a hybrid communication system.

BACKGROUND OF THE INVENTION

It is known that the Universal Mobile Telecommunications System (UMTS) is a third generation communication network technology that was developed by 3GPP (3rd Generation Partnership Project) to improve upon its predecessor the Global System for Mobile Communication (GSM). A UMTS network utilizes a UMTS Terrestrial Radio Access Network (UTRAN) as the air interface (radio access technology) for mobile stations accessing a UMTS network, see, e.g., 25.xxx series of 3GPP standards. A GSM network utilizes a General Packet Radio Service (GPRS) as the air interface for mobile stations accessing a GSM network, see, e.g., 23.xxx series of 3GPP standards.

Further, it is known that the Long Term Evolution (LTE) network is a 3GPP-specified network that was developed to improve upon the UMTS standard and provide an enhanced user experience and simplified technology for next generation mobile broadband. LTE radio access technology is known as Evolved UMTS Terrestrial Radio Access (E-UTRA) and the network is known as an Evolved Packet System (EPS). Details about E-UTRA may be found, by way of example, in the 36.xxx series of 3GPP standards.

Given the various network protocols and radio access technologies that are available, and given the fact that communication systems tend to be hybrid in nature (e.g., use two or more radio access technologies or network protocols) while one or more newer communication standards gradually replace one or more older communication standards, it is known that manufacturers of mobile equipment (e.g., smartphones, portable computers, etc.) design their mobile equipment with the capability to operate via multiple radio access technologies and network protocols. Thus, certain mobile equipment is known to have multi-mode capability so as to be able to selectively operate, for example, in one of two modes such as a GSM mode or an EPS mode, or, for example, in one of three modes such as a GSM mode, a UMTS mode or an EPS mode. Thus, as the mobile device roams in the communication system, it can access the system via whatever mode or modes are available in a given geographic area.

However, it has been shown that mobile equipment that operates using GSM technology can be susceptible to a so-called "man-in-the-middle" (MITM) attack. As described by Ulrike Meyer et al., "A Man-in-the-Middle Attack on UMTS," WiSe'04, Philadelphia, Pa., October 2004, the disclosure of which is incorporated by reference herein in its entirety, the attack allows an intruder to impersonate a valid GSM base station to a UMTS subscriber operating in a GSM network regardless of the fact that UMTS authentication and key agreement is used. As such, an intruder can eavesdrop on all mobile-station-initiated traffic. This allows the intruder to obtain information from the unsuspecting user of a mobile station such as, for example, credit card information, online banking information, etc.

SUMMARY OF THE INVENTION

Principles of the invention provide techniques for use in securing communications in environments such as those comprising hybrid communication systems.

For example, in one aspect of the invention, a method comprises, in a hybrid communication system wherein at least one computing device is configured to selectively operate in a first communication mode or a second communication mode, preventing the at least one computing device from completing an attachment process in the first communication mode when it is determined that authentication data being used to authenticate the at least one computing device in the first communication mode was generated for an authentication process in the second communication mode.

In one embodiment, the first communication mode is a Global System for Mobile Communication (GSM) mode, and the second communication mode is one of a Universal Mobile Telecommunications System (UMTS) mode and an Evolved Packet System (EPS) mode.

The preventing step may further comprise monitoring a value in a portion of the authentication data. The value may comprise a bit value in an authentication management field contained in the authentication data. The bit value may comprise a separation bit in the authentication management field. The separation bit may be set by an authentication authority in a home network of the at least one computing device during computation of an authentication vector.

In one embodiment, when the value is set to a first value, the at least one computing device terminates the attachment process. When the value is set to a second value, the at least one computing device continues the attachment process. The value being set to the first value is an indication that the attachment process is part of a security attack. The at least one computing device may comprise a mobile station (user equipment).

Advantageously, the methodology of the invention can prevent a man-in-the-middle type attack in a hybrid communication system.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Principles of the present invention realize the need to secure communications associated with hybrid communication systems. In the embodiments to follow, hybrid GSM/EPS, GSM/UMTS and GSM/UMTS/EPS systems will be used to illustratively describe the security techniques and mechanisms of the invention. However, it is to be understood that the principles of the present invention are not limited to hybrid communication systems with GSM and EPS and/or UMTS communication modes but rather are more generally suitable for a wide variety of other hybrid communication systems in which it would be desirable to prevent security attacks that may be launched due to the fact that one communication mode in the hybrid communication system implements weaker security than that of another communication mode in the hybrid communication system.

As used herein, the phrase "hybrid communication system" generally refers to a communication system that supports two or more communication modes. "Communication mode" (or simply "mode") generally refers to an operation mode that supports a particular radio access technology and/or network protocol that is used to provide communication and access features for a particular type of communication network. By way of example, communication modes that are part of an illustrative hybrid communication system described herein include a GSM communication mode and an EPS communication mode and/or a UMTS communication mode.

Figure 1:
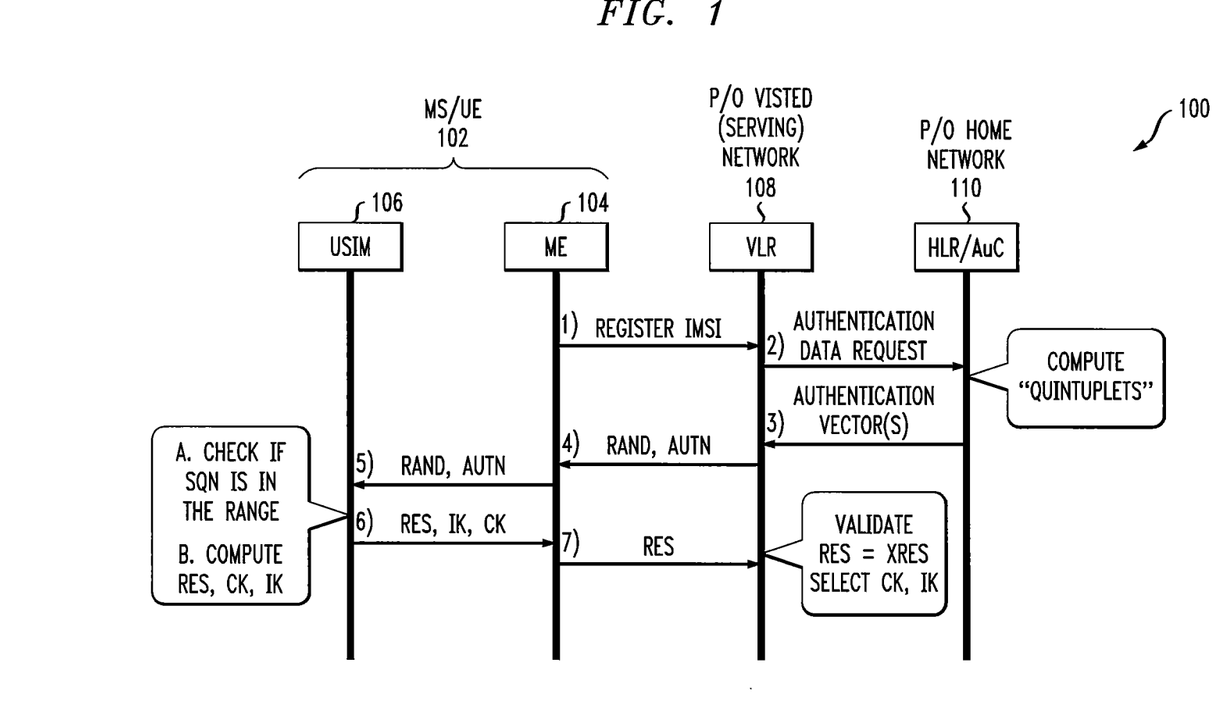
FIG. 1 illustrates an authentication and key agreement procedure for use when a mobile station accesses a network other than its home network.

Referring now to FIG. 1, an authentication and key agreement procedure is shown. This procedure 100 generally describes an authentication and key agreement protocol that occurs when a mobile station (MS) accesses a network (visited network) other than its home network. Procedure 100 generally shows an authentication and key agreement protocol that can be used in a hybrid communication system.

As shown, a mobile station (MS) 102 (also referred to as "User Equipment" or UE) that may be used in a hybrid communication system is composed of Mobile Equipment (ME) 104 and UMTS Subscriber Identity Module (USIM) 106. Examples of a mobile station or user equipment may include, but are not limited to, a mobile or cellular (cell) telephone such as a so-called "smartphone," a portable computer, a wireless email device, a personal digital assistant (PDA) or some other user mobile communication device.

As is known, backhaul typically refers to the portion of the communication system that comprises intermediate links between the core network, or backbone, of the system and the small subnetworks at the edge of the entire system. For example, while cell phones communicating with a base station constitute a local subnetwork (or radio-access network, or UTRAN/E-UTRAN, depending on the access technology), the connection between the cell tower and the core network begins with a backhaul link to the core of a PLMN (Public Land Mobile Network). For instance, in a typical E-UTRA network, backhaul may refer to the one or more communication links between Home eNodeB (HeNB) nodes and nodes in the operator's core network, i.e., MME (Mobility Management Entity), SGW (Serving Gateway), PGW (Packet Data Network Gateway). As is known, eNBs serve as base stations for the user equipment (UE) nodes to access a PLMN. It is to be understood that the term "node" as used herein refers to one or more components or one or more devices (including, but not limited to, communication devices and computing devices) that may be employed by or associated with one or more networks of a communication system.

As further illustrated in FIG. 1, MS 102 communicates with a visited network (also referred to as a serving network) via a Visited Location Register (VLR) 108. Assumed to be present but not expressly shown is an eNB or base station system (BSS) that communicates directly with the MS 102 and acts as an access point for MS 102 to the visited network. The eNB or BSS communicates with the VLR, usually through a radio network controller (RNC, not shown) and a serving GPRS support node (SGSN, not shown) or a mobile switching center (MSC, not shown). The VLR 108 communicates with a Home Location Register (HLR) 110 in the home network of the MS 102. This communication link is usually through the SGSN/MSC in the visited network and a gateway GSN (GGSN, not shown) or another MSC in the home network. The element 110 in FIG. 1 also depicts an Authentication Center (AuC), which may or may not reside on the same node as the HLR function but is shown together in FIG. 1 for simplicity. It is understood that a "home network" is a network with which the MS is subscribed for a particular service (thus, the user of the MS is a "subscriber"). However, the MS may "roam" outside the home network but is still able to access the home network, and thus the service, through a "visited network."

As shown in the procedure 100 of FIG. 1, in step 1, ME 104 (part of MS 102) registers with the VLR 108. This may include the ME 104 providing an International Mobile Subscriber Identity (IMSI) to the VLR 108. The IMSI is a permanent identifier unique to each MS. In order to minimize the amount of times the IMSI is sent over the air interface, a locally (visited network) valid Temporary Mobile Subscriber Identity (TMSI) may also be used to identify the MS 102.

In step 2, the VLR 108 requests authentication data for the MS 102 from the home network via the HLR/AuC 110. The HLR/AuC 110 computes the authentication "quintuplets" or authentication vector (AV) including a random challenge RAND, the corresponding authentication token AUTN, expected authentication response XRES, an integrity key IK and an cyphering (encryption) key CK. The computed AV is sent to the VLR 108 in step 3.

In step 4, the VLR 108 sends the authentication challenge RAND and the authentication token AUTN to the ME 104, which passes the RAND and AUTN on to the USIM 106 (also part of the MS 102) in step 5. The USIM 106 extracts a sequence number (SQN) from the authentication token AUTN and checks the SQN. If SQN is in an acceptable range, the USIM 106 is assured that the AUTN was issued recently by its home network. The USIM 106 then computes its response RES to the authentication challenge RAND, and computes IK and CK from the AUTN.

In step 6, RES, IK and CK are sent to ME 104. The ME 104 sends RES to the VLR 108 in step 7. The VLR 108 then validates MS 102 by comparing RES and XRES. If RES and XRES are equal, then MS 102 is validated (authenticated to the communication system).

As explained in the above-referenced article by Ulrike Meyer et al. entitled "A Man-in-the-Middle Attack on UMTS," WiSe'04, Philadelphia, Pa., October 2004, UMTS authentication calls for the visited network to decide which security algorithms to employ (from weak or even no encryption to strong encryption algorithms). The decision is conveyed to the MS via the security mode command message. The security mode command message may also include an indication of the security capabilities that the MS may have conveyed to the visited network when it initially started the connection process. The security mode command message is integrity protected using the integrity key IK. These steps of conveying the security capabilities back to the MS that it had initially provided and using integrity protection generally ensure against the man-in-the-middle (MITM) attack when dealing with a UMTS-only mobile station. However, as further pointed out, GSM authentication does not utilize these two security steps and opens up an MS with combined UMTS/GSM user equipment to the MITM attack.

Thus, it has been realized that an MS, that is capable of operating in a hybrid communication system in multiple communication modes where one of the communication modes includes a GSM mode, along with a visited network, are susceptible to an MITM attack. However, no reasonable solution has been proposed for overcoming such a problem. Advantageously, illustrative principles of the invention provide one or more reasonable solutions for overcoming this problem, as will be explained in further detail herein.

It is to be appreciated that other communication modes other than GSM mode supported by the user equipment of the MS may, for example, include EPS mode and/or UMTS mode. For example, dual mode MSs are known that operate with EPS and GSM, and EPS and UMTS, while triple mode MSs are known that operate with EPS, GSM and UMTS. While principles of the invention may be implemented in these and other hybrid examples, we illustratively describe a solution to the above-described MITM problem in an EPS/GSM multimode context.

Thus, in accordance with an EPS/GSM hybrid communication system embodiment, we will now describe the MITM attack and a technique for preventing the attack. It is to be understood however that the illustrative techniques described herein may be applied to any MS that supports at least two communication modes where one of the communication modes is susceptible to the MITM attack.

In such an MITM attack, an intruder impersonates a valid GSM base station to an EPS subscriber operating in a GSM network regardless of the fact that EPS authentication and key agreement is used. As such, an intruder can eavesdrop on all mobile-station-initiated traffic. This allows the intruder to obtain information from the unsuspecting user of the MS.

In a first phase of the attack, the attacker obtains the IMSI and any TMSI of the victim subscriber. This can be accomplished by the attacker, using his/her own network node (e.g., laptop computer or smartphone), initiating an authentication process with the MS of the victim subscriber (victim MS). After receiving the IMSI and TMSI (if any) of the victim MS, the attacker ends the authentication process. During this "sniffing" operation, the attacker also detects the security capabilities of the victim MS.

Figure 2:
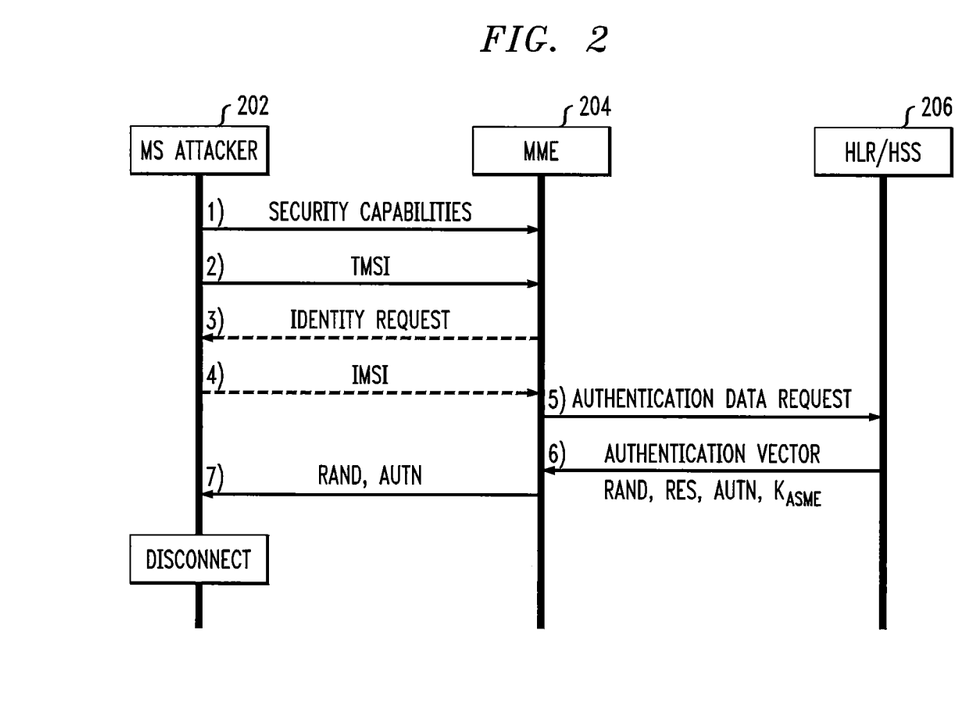
FIG. 2 illustrates a first phase of a man-in-the-middle attack.

The attack then proceeds to a second phase. This second phase is shown in FIG. 2. In FIG. 2, the network node 202 of the attacker is labeled as "MS attacker." The MS attacker 202 impersonates the victim MS to the visited network in order to obtain authentication data of the victim MS from the home network. With this authentication data, the MS attacker can then impersonate the visited network to the victim MS (thus the phrase "man-in-the-middle"). In FIG. 2, the visited network is represented by network element MME 204 (recall, from above, that this is a Mobility Management Entity). The MME 204 communicates with the HLR/HSS 206 of the home network of the victim MS. HSS stands for Home Subscriber Service.

As shown in FIG. 2, step 1 includes the MS attacker 202 sending the security capabilities of the victim MS to the MME 204. In step 2, the MS attacker 202 also sends the TMSI of the victim MS to the MME 204. If the MME 204 cannot resolve the TMSI, it sends an identity request to the MS attacker 202 in step 3. The MS attacker 202 responds by sending the IMSI of the victim MS to the MME 204 in step 4.

Believing that the attachment attempt of the MS attacker 202 is a legitimate EPS mode attachment attempt by the victim MS, in step 5, the MIME 204 sends a request for authentication data to the home network of the victim MS. The request is received by the HLR/HSS 206. In return, in step 6, the HLR/HSS 206 sends to the MME 204 the authentication "quadruplet" or authentication vector (AV) including a random challenge RAND, the corresponding authentication token AUTN, expected authentication response) (RES, and a root key $K_{ASME}$. The root key $K_{ASME}$ in EPS mode is used for integrity and encryption protection in EPS mode. This key provides similar function as the integrity key IK and the cyphering (encryption) key CK in UMTS and is, in fact, derived from IK and CK (thus, the difference between the authentication "quadruplet" referred to here and the authentication "quintuplet" referred to above in FIG. 1). In step 7, the MME 204 sends RAND and AUTN to the MS attacker. With this authentication data, the MS attacker 202 disconnects from the visited network ending the false attachment attempt, and moves to phase three. The MS attacker can disconnect, for example, by powering down its network node.

Returning back for a moment to the MITM attack referred to in the above-referenced Ulrike Meyer et al. article, the next phase in the "Ulrike Meyer" MITM type attack involves the victim MS and the MS attacker establishing a connection whereby the MS attacker now impersonates a GSM base station to the victim MS. The victim MS sends its security capabilities and IMSI/TMSI to the MS attacker. The MS attacker then sends to the victim MS the authentication challenge RAND and the authentication token AUTN that it deceptively obtained from the home network. Believing that this authentication data came from its home network in response to its current attachment attempt, the victim MS successfully verifies the authentication token AUTN, and replies with an authentication response RES. The MS attacker then decides to use no or weak encryption over the air interface between itself and the victim MS and sends the GSM cipher mode command to the victim MS specifying the chosen encryption algorithm. With weak or no encryption, the MS attacker is able to obtain sensitive information from the unsuspecting user of the MS (e.g., credit card information, online banking information, etc.). The attacker can then use this information to the detriment of the victim.

Figure 3:
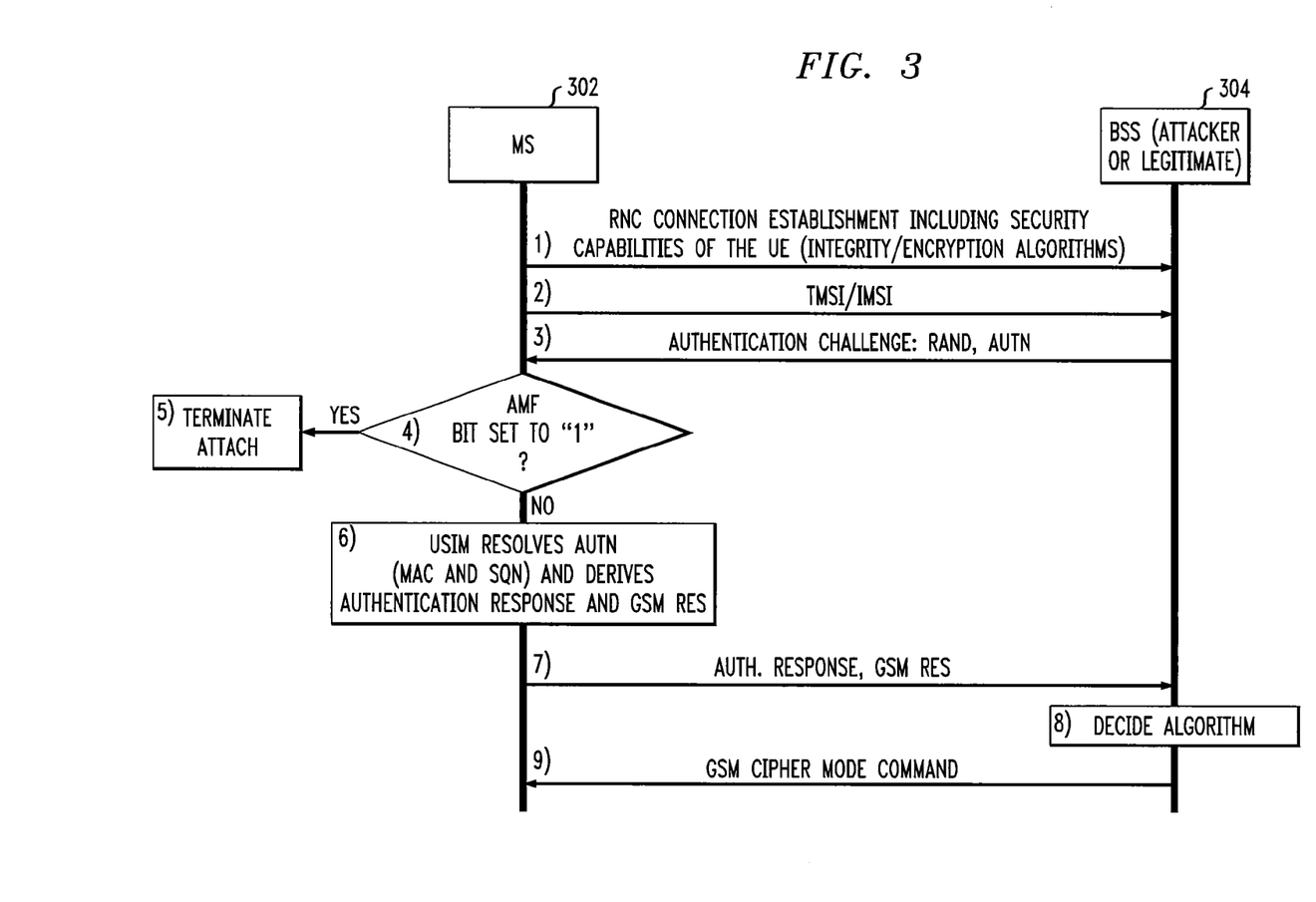
FIG. 3 illustrates a second phase of a man-in-the-middle attack with a methodology for preventing the attack according to an embodiment of the invention.

In accordance with principles of the invention, a technique is employed to overcome the above-described MITM attack. This is illustrated in the context of FIG. 3. It is to be understood that FIG. 3 illustrates the last or third phase of the MITM attack whereby the MS attacker (304 in FIG. 3) impersonates a GSM base station to the victim MS (302 in FIG. 3). It is assumed that phase one (not expressly shown in the figures) and phase two (shown in FIG. 2) have already occurred as described above. Note, however, that this procedure shown in FIG. 3 is performed regardless of whether the MS is communicating with the MS attacker impersonating a GSM base station or with a legitimate GSM base station, since the victim MS does not know if the GSM base station is legitimate or not. Accordingly, for purposes of discussion below, we will refer to element 304 as a "BSS" (base station system) even though, in this example, it is the MS attacker impersonating the BSS.

As shown in step 1 of FIG. 3, the MS 302 provides the BSS 304 with its security capabilities. This is done during RNC connection establishment. In step 2, the MS 302 provides the BSS 304 with its TMSI and/or IMSI. Recall that the MS attacker already has this information (from phase one described above) but receives it anyway so as to maintain the impersonation. In step 3, the BSS 304 sends the MS 302 the authentication RAND and the authentication token AUTN it previously deceptively obtained from the home network (recall that, for the MS attacker, this was in phase two (FIG. 2)).

Figure 4:
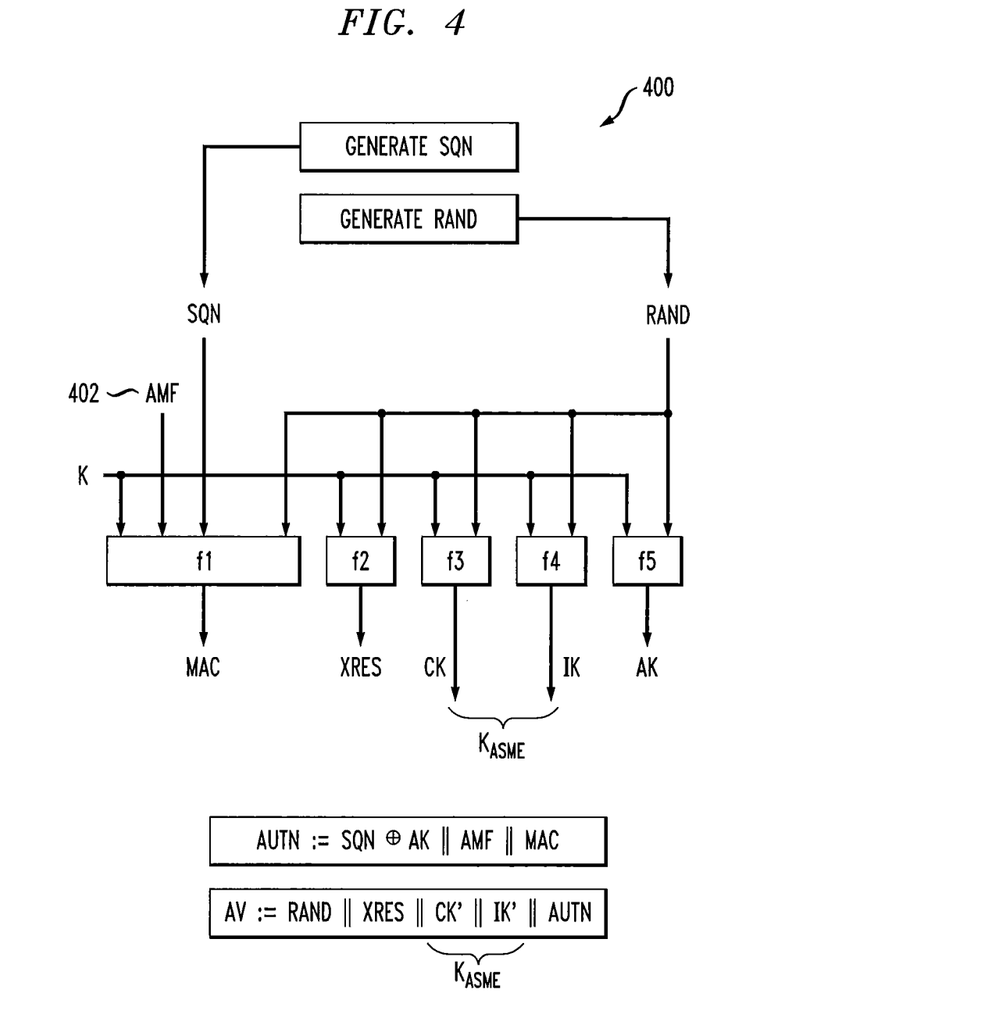
FIG. 4 illustrates an authentication vector according to an embodiment of the invention.

However, rather than verifying AUTN and computing RES and then sending RES to the BSS 304, as done in the above-described "Ulrike Meyer" MITM type attack, principles of the invention provide for checking a particular bit field in the authentication token AUTN, namely, the "separation bit" in the authentication management field (AMF) of the AUTN. 3GPP TS (Technical Specification) 33.401, the disclosure of which is incorporated by reference herein in its entirety, defines bit location zero (0) in the AMF field as the separation bit and states that if the network type equals E-UTRAN then the separation bit in the AMF field of AUTN shall be set to a logic level one (1) to indicate to the UE that the authentication vector is only usable for an authentication and key agreement (AKA) procedure in an EPS context, and if the separation bit is set to logic level zero (0) then the AV is usable in a non-EPS context only (e.g., GSM, UMTS). FIG. 4 illustrates an AKA authentication vector 400 and generally illustrates how AUTN, RAND and XRES are generated. Note that, in EPS operation, $K_{ASME}$ is derived by the home network from CK and IK. Although not expressly shown in FIG. 4 for simplicity, the procedure for such derivation is described in TS 33.401. More importantly, FIG. 4 also shows where the AMF field 402 is located in the authentication vector. The separation bit in the AMF field 402 is set by a node in the home network such as the AuC (Authentication Center) or the HLR/HSS.

Returning now to step 4 in FIG. 3, the MS 302 checks the AUTN it received from the BSS 304 to see what the value of the separation bit in the AMF field is set to. If set to logic 1, then, in step 5, the multi-mode MS 302 knows that this authentication vector comes from an EPS authentication and key agreement (AKA) procedure (i.e., associated with an EPS mode) and the attachment procedure is terminated by the MS 302. That is, when the victim MS determines (from the AMF separation bit being a logic 1) that the authentication token AUTN it received from the MS attacker impersonating a GSM base station was from an EPS AKA procedure (which, in fact, is how the MS attacker obtained it in phase 2 of the attack (FIG. 2)), it knows that this is likely a MITM attack and, advantageously, it terminates the attachment so that the attack cannot proceed.

However, if set to logic 0 indicating that a legitimate GSM base station attachment procedure was likely occurring, then, in step 6, the USIM of the MS 302 resolves the AUTN (including message authentication code or MAC and SQN) and derives an authentication response and GSM RES. That is, the MS 302 continues the attachment procedure with BSS 304 since the AMF separation bit indicates to the MS that the authentication token AUTN came from a legitimate GSM base station. The MS 302 then sends the authentication response and GSM RES to the BSS 304 in step 7. The BSS, in step 8, makes a decision regarding which GSM encryption algorithm to use. The BSS then sends a GSM cipher mode command message with the chosen algorithm to the MS 302, in step 9.

Thus, to summarize, in the last phase of the MITM attack for a hybrid EPS/GSM communication system, the attacker masquerades as a legitimate GSM BSS and replays the EPS AV recorded in the prior phase of the attack. One of the AV components contains the authentication token AUTN, which has the AMF separation bit in one of the information elements. Since that AUTN belongs to the EPS AV, that AMF separation bit is set to value "1." When the UE opens AUTN and gets to the AMF separation bit, it will see that the AV received from the GSM BSS is in fact generated for a different domain, i.e., the EPS domain. Therefore, the UE will decide to terminate the attachment procedure. However, if the AMF separation bit is set to value "0," the UE will continue attachment, compute RES and send RES in the authentication response message to the GSM BSS.

It is to be appreciated that while the MITM prevention methodology in FIG. 3 is described in the context of an EPS/GSM embodiment, other hybrid communication mode embodiments may be similarly implemented including, but not limited to, a UMTS/GSM embodiment or an EPS/UMTS/GSM embodiment. Note that, in each such exemplary embodiment, the GSM mode is the common weak security link in the multimode system. However, it is to be further appreciated that the weak security link may be some other communication mode (i.e., other than GSM) that has one or more security shortcomings that could be exploited by an attacker in any multimode or hybrid communication environment.

Figure 5:
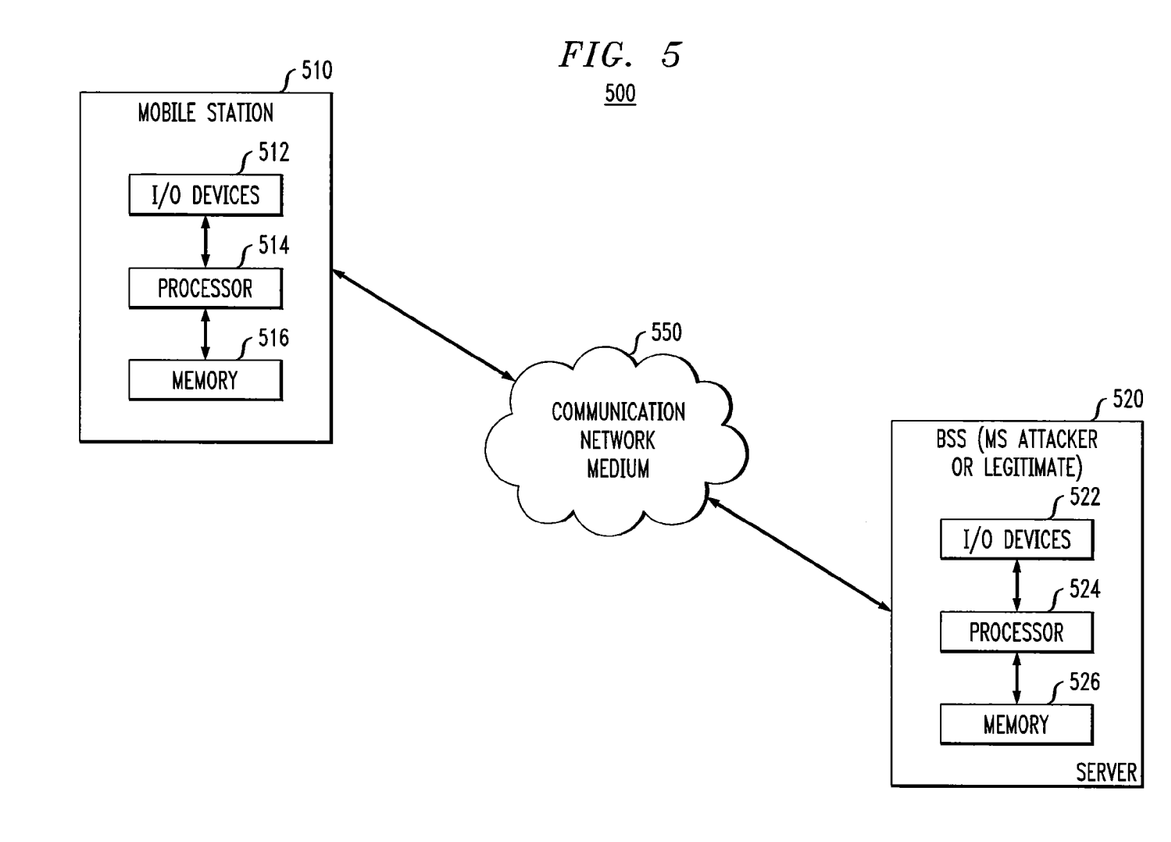
FIG. 5 illustrates a hardware architecture of a part of a communication system and computing devices suitable for implementing one or more of the methodologies and protocols according to embodiments of the invention.

Lastly, FIG. 5 illustrates a generalized hardware architecture of a part of a hybrid communication system 500 suitable for implementing MITM prevention according to the above-described principles of the invention.

As shown, mobile station (MS) 510 (corresponding to MS 302) and base station system 520 (corresponding to BSS 304, which may be MS attacker or a legitimate BSS) are operatively coupled via communication network medium 550. The network medium may be any network medium across which the MS and the base station are configured to communicate. By way of example, the network medium can carry IP packets and may involve any of the communication networks mentioned above. However, the invention is not limited to a particular type of network medium. Not expressly shown here, but understood to be operatively coupled to the network medium, the MS and/or the BSS, are the other network elements shown in or described in the context of FIGS. 1-4 (which can have the same processor/memory configuration described below).

As would be readily apparent to one of ordinary skill in the art, the elements may be implemented as programmed computers operating under control of computer program code. The computer program code would be stored in a computer (or processor) readable storage medium (e.g., a memory) and the code would be executed by a processor of the computer. Given this disclosure of the invention, one skilled in the art could readily produce appropriate computer program code in order to implement the protocols described herein.

Nonetheless, FIG. 5 generally illustrates an exemplary architecture for each device communicating over the network medium. As shown, MS 510 comprises I/O devices 512, processor 514, and memory 516. BSS 520 comprises I/O devices 522, processor 524, and memory 526.

It should be understood that the term "processor" as used herein is intended to include one or more processing devices, including a central processing unit (CPU) or other processing circuitry, including but not limited to one or more signal processors, one or more integrated circuits, and the like. Also, the term "memory" as used herein is intended to include memory associated with a processor or CPU, such as RAM, ROM, a fixed memory device (e.g., hard drive), or a removable memory device (e.g., diskette or CDROM). In addition, the term "I/O devices" as used herein is intended to include one or more input devices (e.g., keyboard, mouse) for inputting data to the processing unit, as well as one or more output devices (e.g., CRT display) for providing results associated with the processing unit.

Accordingly, software instructions or code for performing the methodologies of the invention, described herein, may be stored in one or more of the associated memory devices, e.g., ROM, fixed or removable memory, and, when ready to be utilized, loaded into RAM and executed by the CPU. That is, each computing device (510 and 520) shown in FIG. 5 may be individually programmed to perform their respective steps of the protocols and functions depicted in FIGS. 1 through 4. Also, it is to be understood that block 510 and block 520 may each be implemented via more than one discrete network node or computing device.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising:
    in a communication system wherein a first computing device is configured to selectively operate in two or more communication modes;
    providing security capabilities of the first computing device to a second computing device;
    receiving, at the first computing device, authentication data; and
    proceeding with or dropping an attachment process in a first one of the two or more communication modes based at least in part on a value in the received authentication data.

2. The method of claim 1, wherein the value comprises a bit value in an authentication management field contained in the authentication data.

3. The method of claim 2, wherein the bit value comprises a separation bit in the authentication management field.

4. The method of claim 3, wherein the separation bit is set by an authentication authority in a home network of the first computing device during computation of an authentication vector.

5. The method of claim 1, wherein, when the value is set to a first value, the first computing device drops the attachment process.

6. The method of claim 5, wherein, when the value is set to a second value, the first computing device proceeds with the attachment process.

7. The method of claim 1, wherein the first computing device comprises a mobile station and the second computing device comprises a base station.

8. Apparatus, comprising:
    a memory; and
    at least one processor coupled to the memory and configured to:
        in a communication system, selectively operate in two or more communication modes;
        provide security capabilities of the apparatus to another computing device;
        receive authentication data; and
        proceed with or drop an attachment process in a first one of the two or more communication modes based at least in part on a value in the received authentication data.

9. The apparatus of claim 8, wherein the value comprises a bit value in an authentication management field contained in the authentication data.

10. The apparatus of claim 9, wherein the bit value comprises a separation bit in the authentication management field.

11. The apparatus of claim 10, wherein the separation bit is set by an authentication authority in a home network during computation of an authentication vector.

12. User equipment, comprising:
    in a communication system wherein the user equipment is configured to selectively operate in two or more communication modes;
    a memory; and
    at least one processor coupled to the memory and configured:
        to provide security capabilities of the user equipment to another computing device;
        to receive authentication data; and
        to proceed with or drop an attachment process in a first one of the two or more communication modes based at least in part on a value in the received authentication data.

13. The method of claim 1, wherein the value indicates whether the authentication data being used for the attachment process was generated for an authentication process in a second one of the two or more communication modes.

14. The apparatus of claim 8, wherein the value indicates whether the authentication data being used for the attachment process was generated for an authentication process in a second one of the two or more communication modes.

15. The user equipment of claim 12, wherein the value indicates whether the authentication data being used for the attachment process was generated for an authentication process in a second one of the two or more communication modes.

16. The user equipment of claim 15, wherein the first one of the two or more communication modes is a Global System for Mobile Communication (GSM) mode and the second one of the two or more communication modes is one of a Universal Mobile Telecommunications System (UMTS) mode and an Evolved Packet System (EPS) mode.

17. The method of claim 13, wherein the first one of the two or more communication modes is a Global System for Mobile Communication (GSM) mode.

18. The method of claim 17, wherein the second one of the two or more communication modes is one of a Universal Mobile Telecommunications System (UMTS) mode and an Evolved Packet System (EPS) mode.

19. The apparatus of claim 14, wherein the first one of the two or more communication modes is a Global System for Mobile Communication (GSM) mode.

20. The apparatus of claim 19, wherein the second one of the two or more communication modes is one of a Universal Mobile Telecommunications System (UMTS) mode and an Evolved Packet System (EPS) mode.

* * * * *